March 2, 1965 G. R. QUILICI ET AL 3,172,054
ELECTRONIC CONTROL MECHANISM
Filed Sept. 4, 1962
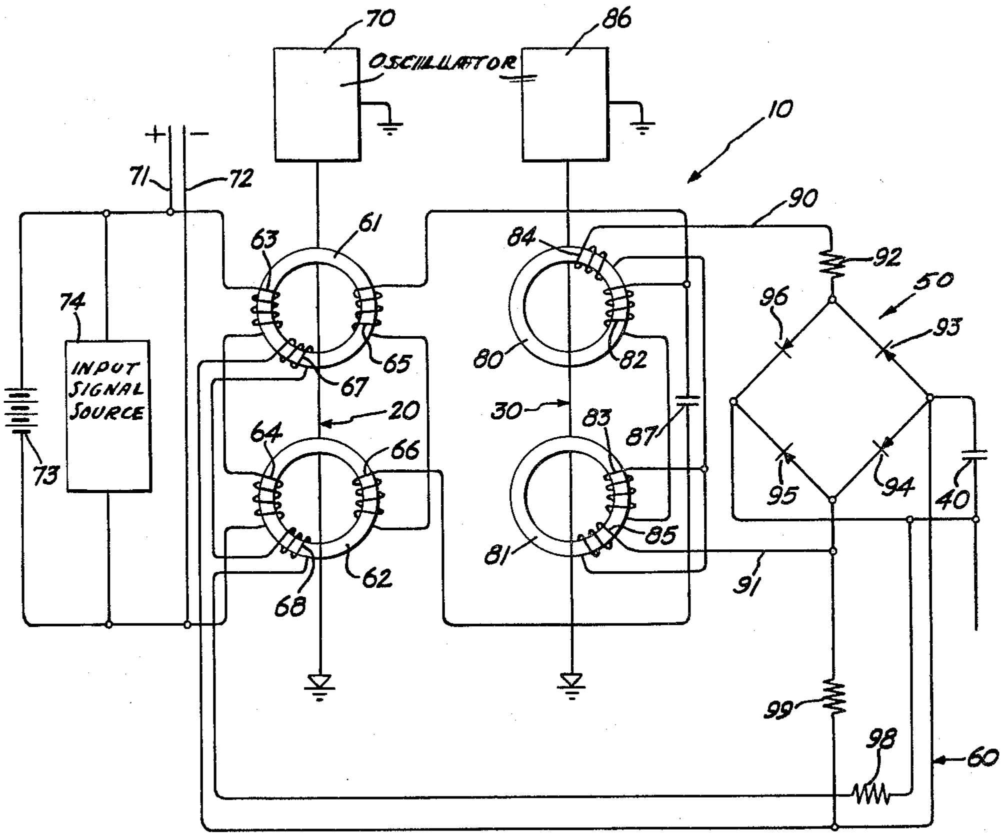
INVENTORS.
GILBERT R. QUILICI
JOSEPH BADAME
BY
Hansen and Lane
THEIR ATTORNEYS.

3,172,054
Patented Mar. 2, 1965

3,172,054

ELECTRONIC CONTROL MECHANISM

Gilbert R. Quilici, 505 S. Cypress Ave., and Joseph Badame, 3268 Oxford Lane, both of San Jose, Calif.

Filed Sept. 4, 1962, Ser. No. 221,159
4 Claims. (Cl. 330—8)

The present invention relates in general to direct current amplifiers, and more particularly to a direct current amplifier employing magnetic cores.

An object of the present invention is to provide an improved direct current amplifier.

Another object of the present invention is to provide a high gain direct current amplifier.

Another object of the present invention is to provide a high gain direct current amplifier that produces a linear output signal.

Another object of the present invention is to provide a direct current amplifier wherein the amplification factor is relatively high and constant.

Another object of the present invention is to provide a direct current amplifier adaptable for use in systems requiring relatively high gain so that synchronization by weak signals may be made possible.

Another object of the present invention is to provide a direct current amplifier wherein a parametron is employed to obtain a high gain.

Another object of the present invention is to provide a direct current amplifier wherein a self-balancing network is employed with a parametron to obtain a high gain with a linear and constant output.

Other and further objects and advantages of the present invention will be apparent to one skilled in the art from the following description taken in conjunction with the accompanying drawing, in which:

The single figure of the drawing is a schematic diagram of the direct current amplifier embodying the present invention.

The direct current amplifier 10 of the present invention comprises a second harmonic generator 20, which is controlled by a direct current signal to generate second harmonic pulses. The polarity of the input signal determines the polarity of the direct current output pulses produced by the second harmonic generator 20. Connected to the output of the harmonic generator 20 is a parametron 30 for generating direct current output pulses.

The parametron 30 is controlled by the output pulses of the second harmonic generator 20 for generating direct current pulses. In addition, polarity of the output pulses of the parametron 30 is controlled by the polarity of the output pulses of the second harmonic generator 20 and are in phase therewith. While the parametron 30 is producing direct current pulses, a storage capacitor 40 through a self-balancing network 50 is either charged or has the charge thereon reduced dependent upon the polarity of the potential on the capacitor 40 and the polarity of the direct current pulses produced by the parametron 30. The charging or the reducing of the charge on the capacitor 40 is accomplished incrementally or in a step-by-step manner.

Interconnecting the capacitor 40 and the second harmonic generator 20 is a feedback network 60. Initially, the parametron 30 is generating direct current pulses to charge the capacitor 40 step-by-step or to increase the magnitude of its potential incrementally. When the potential on the capacitor 40 reaches a predetermined magnitude, the feedback signal applied to the second harmonic generator 20 through the feedback network 60 produces a flux which is sufficient to nullify the flux produced by the input signal of the second harmonic generator 20 and to reverse the polarity of the direct current output pulse of the second harmonic generator 20.

The reversing of the polarity at the output of the second harmonic generator 20 causes the parametron 30 to generate direct current pulses with an opposite polarity. As a consequence thereof, the capacitor 40 has the potential thereon reduced step-by-step until the polarity of the direct current output pulses produced by the second harmonic generator 20 is once again reversed. The above sequence is repeated until a null has been established in the second harmonic generator 20.

As shown in the drawing, the second harmonic generator 20 comprises ferrite magnetic cores 61 and 62 having toroidal configurations. Wound around the magnetic cores 61 and 62 are serially connected input windings 63 and 64, respectively, and serially connected output windings 65 and 68, respectively. Coupled to the magnetic cores 61 and 62 is a conventional oscillator 70 which produces continuously in the preferred embodiment a 50 kilocycle signal at 30 milliwatts.

The second harmonic generator 20 includes input terminals 71 and 72, which are connected across the serially connected input coils 63 and 64. Impressed across the terminals 71 and 72 is a battery 73, or any source of constant direct current energy, having the positive terminal thereof connected to the terminal 71 and having the negative terminal thereof connected to the terminal 72. Also connected to the terminals 71 and 72 is an input signal source 74, such as a measuring apparatus or a transducer.

From the foregoing, it is to be observed that the input current from the source 74 is superimposed on the direct current flow from the battery 73. The direct current from the battery 73 flowing through the input coils 63 and 64 serves to bias the ferrite cores 61 and 62 so that any output of the second harmonic generator 20 produced in the output coils 65 and 66 will be a second harmonic of the 50 kilocycle signal produced by the oscillator 70. While the generator 20 is controlled through its input coils 63 and 64 by the input signal from the source 74, the generator 20 produces direct current pulses by way of its output coils 65 and 66. In the exemplary embodiment, the input signal has a magnitude from 0 to 10 millivolts and the output pulses have a frequency of 100 kilocycles.

The output signal of the second harmonic generator 20 is fed to the parametron 30, which comprises ferrite magnetic cores 80 and 81 having toroidal configurations. Wound around the magnetic cores 80 and 81 are serially connected input coils 82 and 83, respectively, and serially connected output coils 84 and 85, respectively.

Coupled to the magnetic cores 80 and 81 is an oscillator 86 which produces 200 kilocycle signals at 30 milliwatts. It is intended that the oscillator 86 oscillate at periodic intervals or operate periodically at a repetition rate, such as five kilocycles. More specifically, the oscillator 86, preferably, will oscillate for .1 millisecond and then not conduct for .1 millisecond and repeat this periodic sequence at the repetition rate of 5000 times per second. This is accomplished by controlling the energization of the oscillator power supply in a well known manner.

Across the input coils 82 and 83 is connected a capacitor 87, which forms therewith an oscillating circuit having a resonating frequency of 100 kilocycles. The output coils 84 and 85 are connected by way of conductors 90 and 91 to the input side of the bridge rectifier self-balancing network 50 through a resistor 92. The bridge self-balancing network 50 includes the diodes 93–96. Across the output side of the bridge balancing network 50 is connected the storage capacitor 40.

As previously described, the polarity of the input signal to the second harmonic generator 20 will determine the polarity of the direct current output pulses generated by the second harmonic generator 20, which have in the preferred embodiment a frequency of 100 kilocycles. The direct current output pulses produced by the second harmonic generator 20 appear in the output coils 65 and 66 thereof. From the output coils 65 and 66, the direct current pulses are fed to the resonating circuit of the parametron 30 formed by the capacitor 87 and the input coils 82 and 83.

The flux produced in the magnetic cores 80 and 81 by the direct current pulses flowing in the input coils 82 and 83 controls the excitation of the parametron 30 to produce direct current pulses in the output coils 84 and 85 from the power derived from the periodically conducting oscillator 86. In addition thereto, the flux produced in the magnetic cores 80 and 81 by the direct current pulses flowing in the input coils 82 and 83 controls the polarity of the direct current pulses produced in the output coils 84 and 85.

The direct current pulses produced by the parametron 30 when excited by the generator 20 will be at the repetition rate of 5000 per second and will flow through the bridge self-balancing network 50 to charge or to reduce the charge on the storage capacitor 40 depending upon the respective polarities thereof. As heretofore noted, the parametron 30 preferably operates at a sampling rate of 5000 samples per second and during each sample the incremental change of the charge on the capacitor 40 is, in the exemplary embodiment, approximately 0.2%.

Initially, there is no charge on the capacitor 40 and the parametron 30 is generating direct current pulses in the output coils 84 and 85 to charge the capacitor 40. The capacitor 40 is then charged in a step-by-step or incremental manner approximately 10 millivolts per increment until the charge on the capacitor reaches a predetermined magnitude, such as 500 times the magnitude of the input signal or an output range from 0 volt to 5 volts.

Connected across the storage capacitor 40 is the feedback circuit 60, which includes voltage dropping resistors 98 and 99, and the feedback coils 67 and 68 of the second harmonic generator 20. When the potential on the capacitor 40 reaches the predetermined magnitude, the feedback signal flowing in the feedback coils 67 and 68 affects the flux induced in the magnetic cores 61 and 62 to nullify the flux produced by the input coils 63 and 64 and to cause the polarity of the direct current output pulses produced by the second harmonic generator 20 to be reversed.

As a consequence thereof, the direct current output pulses generated by the parametron 30 are reversed. Thereupon, the charge on the storage capacitor 40 is reduced in a step-by-step manner until the polarity of the direct current pulses produced by the second harmonic generator 20 are once again reversed. The above sequences are repeated until a null signal is produced in the input of the second harmonic generator 20.

In the operation of the direct current amplifier 10, the battery 73 biases the second harmonic generator 20 so that the output thereof produces a second harmonic signal from the coupled oscillator produced by the oscillator 70. In the preferred embodiment, the signal produced by the oscillator 70 is a 50 kilocycle signal. The second harmonic generator 20 is excited by the direct current input signal from the source 74, whereby the output coils 65 and 66, in the preferred embodiment, of the harmonic generator 20 produce a 100 kilocycle signal in the form of direct current pulses.

The direct current pulses generated by the second harmonic generator 20 are fed to the parametron 30. Coupled to the magnetic cores 80 and 81 of the parametron 30 is the oscillator 86 that conducts and is nonconducting at prescribed periodic intervals, such as at 5000 cycles per second, to produce, in the preferred embodiment, a 200 kilocycle signal. The output pulses generated by the second harmonic generator 20 control the parametron 30 to produce direct current output pulses from the power derived from the oscillator 86 and control the polarity of the output pulses from the parametron 30.

The direct current output pulses produced by the parametron 30 charge initially the storage capacitor 40 incrementally until the charge on the storage capacitor 40 reaches a predetermined magnitude, such as 500 times the input signal. When the storage capacitor 40 is charged to the predetermined magnitude, the feedback windings 67 and 68 nullify the flux produced by the input signal from the source 74 and cause the polarity of the output direct current pulses of the second harmonic generator 20 to be reversed.

As a consequence thereof, the direct current output pulses generated by the parametron 30 are reversed. Thereupon, the charge on the storage capacitor 40 is reduced in a step-by-step manner until the polarity of the direct current pulses produced by the second harmonic generator 20 are once again reversed. The above operation is repeated until a null or balance condition is reached in the input of the second harmonic generator 20.

From the foregoing, it is to be observed that the parametron enables high gains to be obtained by the direct current amplifier of the present invention. Hence, the direct current amplifier of the present invention enables relatively weak signals to synchronize the production of signals with relatively high magnitudes. The self-balancing network of the present invention enables a high gain to be achieved without sacrificing either linearity or a constant output signal.

While we have illustrated and described a preferred embodiment of the present invention, it will be understood, however, that various changes and modifications may be made in the details thereof without departing from the scope of the invention as set forth in the appended claims.

Having thus described the invention, what we claim as new and desire to protect by Letters Patent is defined in the following claims.

We claim:

1. A direct current amplifier comprising a pulse generator controlled by a direct current signal for producing direct current pulses, a parametron controlled by the direct current pulses produced by said pulse generator for producing direct current pulses at periodic intervals and at a polarity determined by the polarity of the pulses produced by said pulse generator, signal storage means connected to said parametron and charged incrementally by the direct current pulses produced by said parametron, and a feedback network interconnecting said signal storage means and said pulse generator for reversing the polarity of the direct current pulses produced by said pulse generator in response to said signal storage means having a potential thereon of a predetremined magnitude.

2. A direct current amplifier comprising a pulse generator controlled by a direct current signal for producing direct current pulses, a parametron controlled by the direct current pulses produced by said pulse generator for producing direct current pulses at periodic intervals and at a polarity determined by the polarity of the pulses produced by said pulse generator, signal storage means connected to said parametron and charged incrementally by the direct current pulses produced by said parametron, a self-balancing network interposed between said parametron and said signal storage means, and a feedback network interconnecting said signal storage means and having the ability for reversing the direct current pulses produced by said pulse generator in response to said signal storage means having a potential thereon of a predetermined magnitude.

3. A direct current amplifier comprising a pulse generator controlled by a direct current signal for producing direct current pulses, a pulsing circuit controlled by the direct current pulses produced by said pulse generator for producing direct current pulses having a polarity controlled by the polarity of the direct current pulses produced by said pulse generator, said pulsing circuit including means for producing oscillations at periodic intervals, a capacitor connected to said pulsing circuit, said capacitor being charged by the pulses produced by said pulsing circuit in a step-by-step manner when the polarity of the pulses applied to the capacitor is in one direction, and having the charge thereon reduced by the pulses produced by said pulsing circuit when the polarity of the pulses is reversed, and a feedback network interconnecting said capacitor and said pulse generator for reversing the polarity of the direct current pulses produced by said pulse generator in response to said capacitor having a potential thereof of a predetermined magnitude until a null condition is reached in the input of said pulse generator.

4. A direct current amplifier comprising a generator controlled by a direct current signal for producing direct current pulses, said generator including means for producing oscillations at a predetermined frequency, a parametron controlled by the direct current pulses produced by said generator for producing direct current pulses, signal storage means connected to said parametron and charged incrementally by the direct current pulses produced by said parametron, and a feedback network interconnecting said signal storage means and said generator for reversing the polarity of the direct current pulses produced by said pulse generator in response to said signal storage means having a potential thereon of a predetermined magnitude.

References Cited by the Examiner

UNITED STATES PATENTS

| | | | |
|---|---|---|---|
| 2,838,687 | 6/58 | Clary | 331—165 |
| 2,948,818 | 8/60 | Goto | 331—165 |

ROY LAKE, *Primary Examiner.*